(No Model.)

C. E. WYMAN.
HARROW.

No. 494,614. Patented Apr. 4, 1893.

Witnesses:
O. S. Duvall Jr.
W. S. Duvall.

Inventor
Charles E. Wyman.
By his Attorneys,
C. A. Snow & Co.

UNITED STATES PATENT OFFICE.

CHARLES E. WYMAN, OF MARTINSBURG, INDIANA.

HARROW.

SPECIFICATION forming part of Letters Patent No. 494,614, dated April 4, 1893.

Application filed December 8, 1891. Serial No. 414,410. (No model.)

*To all whom it may concern:*

Be it known that I, CHARLES E. WYMAN, a citizen of the United States, residing at Martinsburg, in the county of Washington and State of Indiana, have invented a new and useful Harrow, of which the following is a specification.

This invention relates to improvements in harrows; and the objects in view are to provide a harrow of great simplicity, strength and durability, that may be readily folded for convenient transportation, which possesses great flexibility, thus conforming to the undulations of the surface over which it operates, and so constructed as to avoid collecting trash and to adapt it to readily ride over such obstructions that might otherwise injure the teeth.

With these objects in view, the invention consists in certain features of construction hereinafter specified and particularly pointed out in the claims.

Figure 1:
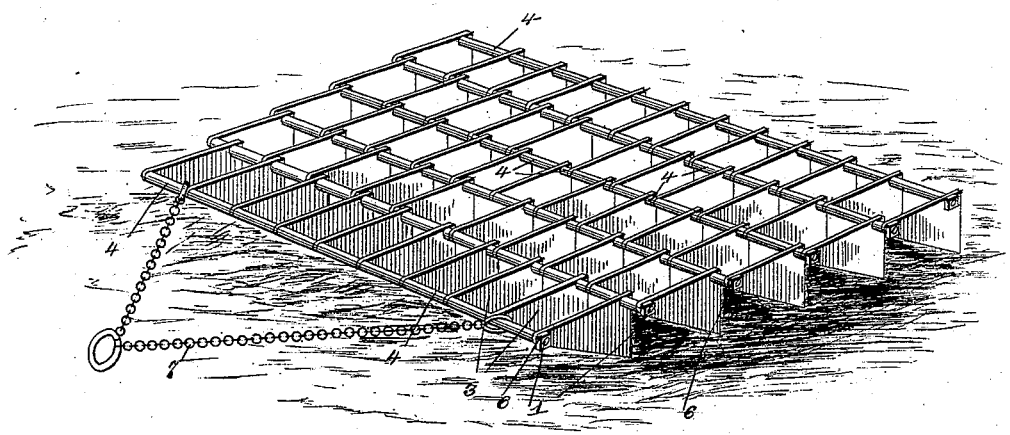
Figure 2:
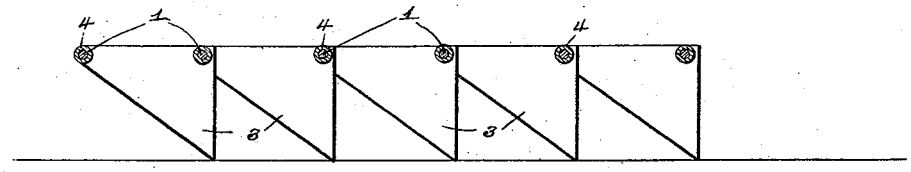
Figure 3:
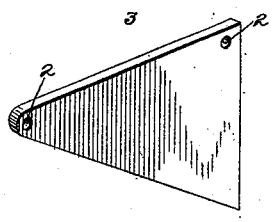

Referring to the drawings:—Figure 1 is a perspective of a harrow constructed in accordance with my invention. Fig. 2 is a sectional view of the same. Fig. 3 is a detail in perspective of one of the harrow teeth.

Like numerals of reference indicate like parts in all the figures of the drawings.

In constructing the harrow I employ a series of cylindrical rods 1, which I dispose transversely and gradually decrease in length toward the front end of the series. These rods pass through perforations 2, formed in the apex and angle of a series of triangular sheet-metal teeth 3, those edges of the triangular teeth which constitute the hypotenuse, being beveled if desired to form the cutting edges of the teeth. The teeth are loosely connected with the rods, and are spaced apart by means of a series of tubular sleeves 4, mounted upon the rods, preferably formed of gas-pipe, and interposed between each pair of teeth. Each alternate series of the intermediate rods is shorter than its companion, the short sleeves of one rod alternating with the long sleeves of the rod immediately in rear, so that as will be seen, the teeth are alternately located with relation to the series of teeth of the next rod, so that every portion of the surface over which the harrow passes is thoroughly pulverized. The ends of the rods are threaded, and taps or nuts 6 are located thereon, to prevent the sleeves and teeth from accidentally coming off. To the front bar of the series there is connected a draft-chain 7, to which a single or doubletree may be connected in the ordinary manner.

From the foregoing description in connection with the accompanying drawings it will be seen that I have provided a harrow possessing great flexibility, and that it is capable of being folded compactly for the purpose of storage, transportation, &c. Furthermore the flexibility of the harrow permits the same to follow all the undulations of the surface of the ground over which the harrow is operated. The inclined edges of the teeth prevent the collection of trash and render the harrow of light draft and furthermore adapts the harrow to ride over such obstructions as stones, stumps, &c., without injury, or sudden jerks imparted to the team. It will be seen, furthermore, that no two of the teeth are in longitudinal alignment, thereby enabling all of the sections of the harrow to be folded into the width of a single section.

Having described my invention, what I claim is—

In a harrow, the combination with the series of parallel, cylindrical harrow bars, the lengths of which increase regularly from front to back of the triangular harrow teeth fulcrumed at their opposite ends upon said harrow bars, the tubular sleeves arranged upon the harrow bars between the teeth, said sleeves being of varying lengths whereby the teeth are held out of longitudinal alignment, and retaining nuts upon the extremities of the harrow bars, substantially as specified.

In testimony that I claim the foregoing as my own I have hereto affixed my signature in the presence of two witnesses.

CHARLES E. WYMAN.

Witnesses:
THOS. W. WYMAN,
WILLIAM F. LINDSEY.